Aug. 8, 1961     C. L. TANNER     2,995,337
VALVE
Filed March 30, 1959
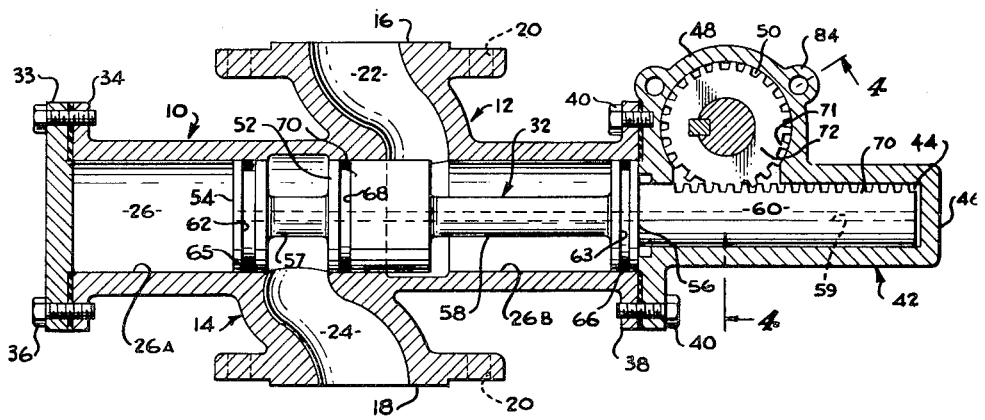
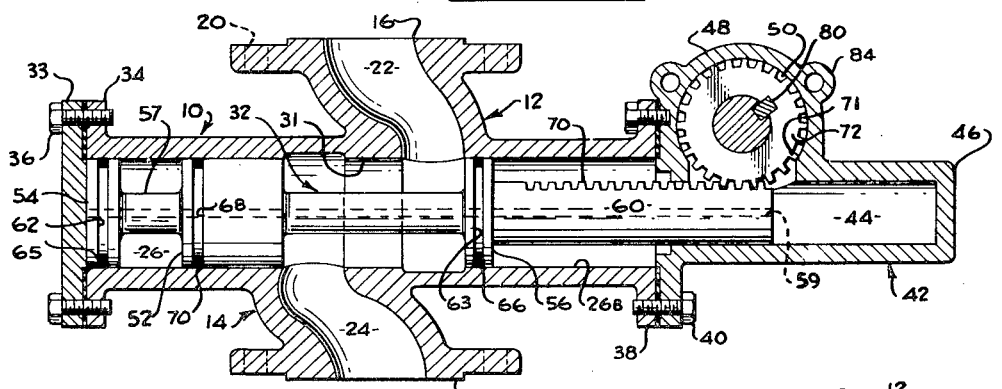
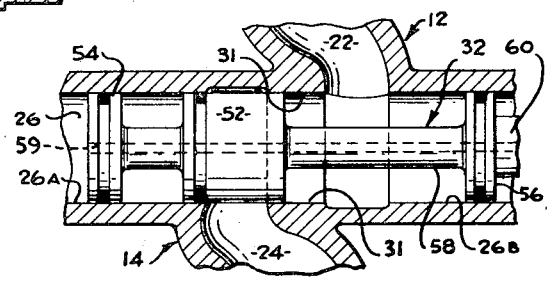
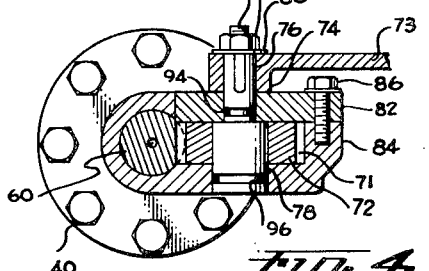
INVENTOR.
CHARLES L. TANNER
BY
ATTORNEYS United States Patent Office 2,995,337
Patented Aug. 8, 1961

2,995,337
VALVE
Charles L. Tanner, 1641 Bedford St.,
Los Angeles 35, Calif.
Filed Mar. 30, 1959, Ser. No. 802,760
4 Claims. (Cl. 251—282)

This invention has to do generally with piston type valves and more particularly to valves of this type which are adapted for installation in the delivery conduits or pipes at volatile fuel loading racks and the like to control delivery of volatile fluids such as gasoline and other hydrocarbons.

Piston type valves are widely used for controlling volatile fluids since they can be rapidly operated and, when open, offer only minimum resistance to full flow. A difficulty of such vales has been in the use of O-rings to effect a positive seal between the piston valve member and the valve body since these rings are apt to be unseated from their grooves by high velocity or turbulent fluid flow in the region of the rings during opening and closing of the valve. Another disadvantage with conventional piston valves employing O-rings has been that, in the event of fire or excessive heat, the O-rings may be destroyed permitting the valve to leak large amounts of fluid which feeds the fire.

It therefore is an object of the invention to provide an improved novel valve construction for piston valves which overcomes the above noted disadvantages.

More particularly it is an object of the invention to provide a novel piston type valve construction wherein the sealing rings, preferably O-rings, are disposed at all times out of contact with high velocity or turbulent flow of fluid through the valves as occurs especially during opening and closing of the valve, thereby insuring against accidental unseating of the rings from the grooves in which they are normally positioned.

A further object is to provide a piston type valve wherein the metal piston itself closely fits the valve body so that in the event the rubber sealing rings are destroyed by fire, leakage through the valve will be inconsequential and in no event of such volume as to support continued combustion.

These and other objects will be apparent from the drawing and the following description. In the drawing, which forms part of the present specification:

FIG. 1 is an axial sectional view taken through my improved piston-type valve with parts shown in elevation and the valve member seen in seated or closed position;

FIG. 2 is a similar view with the valve in fully open position;

FIG. 3 is a detail view in the same plane showing the valve in its initial closing position, that is, with the flow stopped but before the valve is fully seated, and illustrating the position of the sealing ring outside of the flow even before the valve has seated but after fluid movement has stopped; and FIG. 4 is a transverse sectional view along the line 4—4 of FIG. 1 particularly showing the connection of the operating ratchet crank.

As here illustrated, there is provided an essentially tubular valve housing or body 10 formed with an opposing pair of radially extending, short tubular necks 12, 14 individually provided with outwardly flared terminal attachment flanges 16 and 18, respectively, conventionally apertured as at 20 for insertion of bolts, or otherwise provided with attachment means for coupling to fluid lines. Each laterally extending neck is formed with a fluid passage leading from the exterior to a main longitudinal chamber 26 of the housing body 10, the passages being designated 22 and 24, respectively, and being axially offset at their inner ends with respect to chamber 26. Preferably the passage 24 serves as the inlet and passage 22 as the outlet, although this is not essential. It will be apparent that fluid may flow from passage 24 to the other passage 22 through section 31 of the valve body unless hampered by the valve member 32. However, due to the offset relation of the inner ends of passages 22, 24 it will be apparent that closure of either passage will block passage through the two, or that alternately, closure can be effected by plugging the annular section 31.

The piston chamber 26 is closed at one end by suitable means such as a closure plate 33 secured to an end flange 34 of the valve body by a peripheral series of headed screws 36. To a similar flange 38 at the opposite end of the valve body there is bolted by screws 40 a generally axially aligned, tubular housing 42 formed with a cylindrical chamber 44 closed at its outer end 46 and having an upwardly extending gear housing 48 formed with a central cavity 50 in open communication with chamber 44.

The aforementioned valve member 32 is slidably disposed within the tubular valve body 10, the valve being generally cylindrical as is the chamber 26 in which it is received. The valve member includes a main cylindrical portion or annulus 52 and a pair of terminal annuli designated 54 and 56, respectively. Valve stem portions 57 and 58 connect the three annuli. In this connection, if desired, the annuli 52 and 54 may be formed as one elongated annulus of constant diameter. A relief or vent passage 59 extends axially through the valve from end to end also through an operating stem 60 which extends beyond the annulus 56.

The three annuli 52, 54 and 56 are cylindrical and adapted to closely fit the walls of the chamber 26 of the valve body, namely, the cylindrical wall sections 26A, 26B and the aforementioned section 31. Additionally each of the three annuli is provided with a peripheral groove to receive a seal ring, such as one of the O-ring type. These grooves are designated 62 and 63 in the annuli 54 and 56, respectively, and the O-rings therein are designated 65 and 66, respectively. The central or main annulus 52 is provided with a peripheral groove 68 located adjacent the outer end of the annulus and this contains an O-ring 70.

With the construction described it will be apparent that the annulus 52 extends axially a sufficient distance to bridge the passage 24 and partially enter the section 31 of the valve body before the O-ring 70 thereof escapes from the confines of the wall 26A, thereby protecting this O-ring from being exposed to any high velocity or turbulent fluid flow such as might cause it to be dislodged from its groove. Also it will be apparent that the inner end portion of the annulus 52 upon entering the section 31 will effect a stoppage of the flow through the valve since there is a close sliding fit of the parts.

Further, it will be seen that the longitudinal distance between the pair of terminal annuli 54, 56 is such that when the valve member is moved to its extreme left position of FIG. 2, the annulus 56 is positioned just beyond the outlet passage 22, and when it is moved to its extreme right position of FIG. 1, the annulus 54 is outwardly adjacent the inlet passage 24. Thus the seal rings 65 and 66 are at all times confined by the walls 26A and 26B, respectively.

To effect movement of the valve member, the operating stem 60 is formed with transversely directed rack teeth 70 disposed in driving relation with teeth 71 of a valve-operating pinion 72. An external crank handle or operating lever 73 has its inner tubular hub 74 secured to the projecting bearing pin 76 of a short shaft 78 on which is mounted the pinion wheel 72 by means of a shaft-locking key 80. The bearing pin 76 is journaled in a cover plate 82 secured to tapped apertures of housing ears or bosses 84 by headed screws 86, the operating handle 73 being secured to the outer end of the bearing pin by a washer 88 and nut 90 mounted on its radially restricted, threaded end 92. A pair of O-rings 94, 96 seated in corresponding grooves seal the respective portions of the shaft.

Accordingly, by rotating the handle 73 in one direction or the other, the drive shaft 76 is longitudinally moved by the pinion 72 to position the valve piston the desired location. In this connection it is important to note that not only in the two extreme positions, that is, fully open and fully closed, illustrated respectively in FIGS. 1 or 2, but also in the intermediate or preliminary closed position of FIG. 3, the sealing ring 70 carried by the annulus 52 is not in the line of flowing fluid, although of course it is exposed to the stationary fluid of channel 24 in moving across the corresponding aperture. However, the inner end portion of the annulus 52 enters the machined or closely fitting section 31 of the housing tube intermediate the inner ends of the fluid passages 22, 24 before the sealing ring 70 is exposed at all to the moving fluid, and as soon as the annulus 52 moves into the passage 31, the fluid flow is accordingly terminated. Consequently it will be seen that the seal 70 cannot be washed away by any turbulence or high velocity of fluid flow. At the same time if seal ring 70 becomes partially ineffective or is destroyed as by fire, the close fit of the inner surface 31 about the annulus 52, still maintains a substantial seal. In addition it will be seen that the movement of the piston necessary for opening or closing the flow is relatively small, and in addition, by means of the handle leverage, the amount of energy required is comparatively small, even for the close fitting engagement of the parts. Further in this connection the valve member is not biased by pressure in the line in a manner to affect either opening or closing movement of the valve.

Although I have illustrated and described a preferred form of my invention, I contemplate that various changes and modifications can be made therein without departing from the invention, the scope of which is indicated by the following claims.

I claim:

1. A valve of the character described, comprising a tubular valve body providing an elongated cylindrical chamber interrupted by a pair of ports spaced apart axially of the chamber and leading to the exterior of the body, a piston-type valve member mounted for close sliding movement in said chamber, said valve member including a main annulus of greater length than the width of a port and carrying a first resilient sealing ring spaced axially outwardly from the leading end of said main annulus a distance greater than the width of a port, said valve member carrying a second sealing ring spaced outwardly of said first sealing ring, said valve member having a second annulus positioned beyond said port and carrying a sealing ring, said main annulus and said second annulus being connected by a stem of less cross-sectional area than said chamber, said valve member being limited in movement and so constructed and arranged that said second sealing ring is always positioned outwardly of one of said ports and the sealing ring of said second annulus is always positioned beyond the other of said ports, and means for adjustably moving said valve member from an open position wherein said main annulus is positioned to one side of said ports to a closed position wherein said main annulus is disposed between said ports.

2. A valve of the character described comprising a tubular housing formed with an inner, smooth-walled cylindrical section intermediate its ends and with an external pair of conduit-attachment sections each having an internal fluid passage disposed adjacent opposite ends of said section so as to be in communication therethrough; a valve member longitudinally movable in said housing and characterized by a cylindrical portion adapted to enter and closely fit said cylindrical section in substantial sealing relation, said cylindrical portion of said valve being of greater length than the diameter of the adjacent fluid passage and carrying a sealing ring adjacent its following end disposed to be out of reach of fluid flowing through the connected channel and passage before the lead end of the cylindrical portion of the valve enters the cylindrical section, a stem secured to said cylindrical portion of the valve member, said stem extending axially from opposite ends of said portion, and a pair of annuli disposed adjacent the extremities of said stem and individually carrying a sealing ring in contact with the interior of said housing, and means for moving said valve member.

3. A valve, comprising a valve body providing an elongated valve chamber defined in part by a cylindrical side wall, said body having an inlet passage terminating at its inner end in said chamber and having an outlet passage terminating at its inner end in said chamber at a region spaced axially of the chamber from the inner end of said inlet passage, said cylindrical wall being interrupted by an annular groove in the region of the inner end of said inlet passage, a piston-type valve member mounted in said chamber for movement axially thereof, said valve member being closely receivable in said cylindrical wall in substantial sealing relation thereto, said valve member being of greater length than the width of said groove, a resilient sealing ring carried by said valve member at a distance from the leading end such that it is outwardly of said groove in the region of said inlet passage until the leading end of the valve member enters the cylindrical portion of said chamber beyond said groove, and means for adjustably moving said valve member from an open position outwardly of said groove to a closed position past said groove.

4. A valve as set forth in claim 3 in which the resilient sealing ring is carried in a peripheral groove in the valve member.

References Cited in the file of this patent

UNITED STATES PATENTS

| | | |
|---|---|---|
| 1,157,215 | Gille | Oct. 19, 1915 |
| 2,854,998 | MacGlashan | Oct. 7, 1958 |